(12) United States Patent
Anderson, Jr. et al.

(10) Patent No.: US 7,210,160 B2
(45) Date of Patent: Apr. 24, 2007

(54) AUDIO/VIDEO PROGRAMMING AND CHARGING SYSTEM AND METHOD

(75) Inventors: Tazwell L. Anderson, Jr., Atlanta, GA (US); Mark A. Wood, Decatur, GA (US)

(73) Assignee: Immersion Entertainment, L.L.C., Atlanta, GA (US)

( * ) Notice: Subject to any disclaimer, the term of this patent is extended or adjusted under 35 U.S.C. 154(b) by 692 days.

(21) Appl. No.: 10/159,666

(22) Filed: May 30, 2002

(65) Prior Publication Data
US 2002/0152476 A1 Oct. 17, 2002

Related U.S. Application Data

(63) Continuation-in-part of application No. 09/322,411, filed on May 28, 1999, now Pat. No. 6,578,203.

(51) Int. Cl.
H04N 7/18 (2006.01)
(52) U.S. Cl. .................................. 725/81; 348/552
(58) Field of Classification Search ............ 348/730, 348/552, 14.04; 455/556, 557, 550, 551
See application file for complete search history.

(56) References Cited

U.S. PATENT DOCUMENTS

| | | | |
|---|---|---|---|
| 4,504,861 A | 3/1985 | Dougherty | 358/143 |
| 4,866,515 A | 9/1989 | Tagawa et al. | 381/86 |
| 4,887,152 A | 12/1989 | Matsuzaki et al. | 358/86 |
| 4,965,825 A | 10/1990 | Harvey et al. | 380/9 |
| 5,133,081 A | 7/1992 | Mayo | |
| 5,138,722 A | 8/1992 | Urella et al. | |
| 5,243,415 A | 9/1993 | Vance | |
| 5,289,272 A | 2/1994 | Rabowsky et al. | 348/8 |
| 5,392,158 A | 2/1995 | Tosaki | |
| 5,448,291 A | 9/1995 | Wickline | |
| 5,481,478 A | 1/1996 | Palmieri et al. | 364/514 |
| 5,485,504 A | 1/1996 | Ohnsorge | |
| 5,510,828 A | 4/1996 | Lutterbach | |
| 5,546,099 A | 8/1996 | Quint et al. | |
| 5,585,850 A | 12/1996 | Schwaller | |
| 5,585,858 A | 12/1996 | Harper et al. | 348/485 |
| 5,600,368 A | 2/1997 | Matthews, III | |
| 5,613,191 A | 3/1997 | Hylton et al. | |
| 5,617,331 A | 4/1997 | Wakai et al. | 364/514 |
| 5,627,915 A | 5/1997 | Rosser et al. | |
| 5,631,693 A | 5/1997 | Wunderlich et al. | 348/7 |

(Continued)

FOREIGN PATENT DOCUMENTS

CA 2237939 9/1999

OTHER PUBLICATIONS

PCT International Search Report dated Feb. 5, 2004; In re International Application No. PCT/US03/31696.

(Continued)

Primary Examiner—Paulos Natnael
(74) Attorney, Agent, or Firm—Dean D. Small; Small Patent Law Group

(57) ABSTRACT

The preferred embodiment of the present invention provides a system and method for programming and/or charging one or more audio/video devices such that the audio/video devices will be programmed and charged to receive transmitted audio and video signals associated with an event, allowing a user to use the audio/video device to observe the sights and sounds of the event. A preferred embodiment of the present invention includes a cart with a docking port for each of a plurality of personal audio/video devices, a charger configured to charge the power source of each personal audio/video display device, and programming logic configured to program each of the personal audio/video devices.

47 Claims, 3 Drawing Sheets

U.S. PATENT DOCUMENTS

| | | | |
|---|---|---|---|
| 5,663,717 A | 9/1997 | DeLuca | |
| 5,696,521 A | 12/1997 | Robinson et al. | |
| 5,708,961 A | 1/1998 | Hylton et al. | |
| 5,729,471 A | 3/1998 | Jain et al. | |
| 5,742,521 A | 4/1998 | Ellenby et al. | 364/550 |
| 5,760,819 A | 6/1998 | Sklar et al. | 348/8 |
| 5,760,824 A | 6/1998 | Hicks, III | |
| 5,767,820 A | 6/1998 | Bassett et al. | 345/8 |
| 5,793,416 A | 8/1998 | Rostoker et al. | |
| 5,806,005 A | 9/1998 | Hull et al. | |
| 5,808,695 A | 9/1998 | Rosser et al. | |
| 5,841,122 A | 11/1998 | Kirchhoff | |
| 5,847,612 A | 12/1998 | Birleson | |
| 5,847,762 A | 12/1998 | Canfield et al. | |
| 5,867,223 A | 2/1999 | Schindler et al. | 348/552 |
| 5,892,554 A | 4/1999 | DiCicco et al. | |
| 5,894,320 A | 4/1999 | Vancelette | |
| 5,903,395 A | 5/1999 | Rallison et al. | |
| 5,920,827 A * | 7/1999 | Baer et al. | 702/3 |
| 5,946,635 A * | 8/1999 | Dominguez | 455/558 |
| D413,881 S | 9/1999 | Ida et al. | |
| 5,953,076 A | 9/1999 | Astle et al. | |
| 5,982,445 A | 11/1999 | Eyer et al. | |
| 5,990,958 A | 11/1999 | Bheda et al. | |
| 5,999,808 A | 12/1999 | LaDue | |
| 6,002,720 A | 12/1999 | Yurt et al. | |
| 6,002,995 A | 12/1999 | Suzuki et al. | |
| 6,009,336 A | 12/1999 | Harris et al. | |
| 6,016,348 A | 1/2000 | Blatter et al. | |
| 6,020,851 A | 2/2000 | Busack | |
| 6,034,716 A | 3/2000 | Whiting et al. | |
| 6,035,349 A | 3/2000 | Ha et al. | |
| 6,043,837 A | 3/2000 | Driscoll, Jr. et al. | |
| 6,060,995 A | 5/2000 | Wicks et al. | |
| 6,064,860 A | 5/2000 | Ogden | |
| D426,527 S | 6/2000 | Sakaguchi | |
| 6,078,954 A | 6/2000 | Lakey et al. | |
| 6,084,584 A | 7/2000 | Nahi et al. | |
| 6,095,423 A | 8/2000 | Houdeau et al. | |
| 6,100,925 A | 8/2000 | Rosser et al. | |
| 6,104,414 A | 8/2000 | Odryna et al. | |
| 6,121,966 A | 9/2000 | Teodosio et al. | |
| 6,124,862 A | 9/2000 | Boyken et al. | |
| 6,128,143 A | 10/2000 | Nalwa | |
| 6,131,025 A | 10/2000 | Riley et al. | |
| 6,133,946 A | 10/2000 | Cavallaro et al. | |
| 6,137,525 A | 10/2000 | Lee et al. | |
| 6,166,734 A | 12/2000 | Nahi et al. | |
| 6,192,257 B1 | 2/2001 | Ray | |
| 6,195,090 B1 | 2/2001 | Riggins, III | |
| 6,215,475 B1 | 4/2001 | Meyerson et al. | |
| 6,327,570 B1 * | 12/2001 | Stevens | 705/7 |
| 6,330,021 B1 * | 12/2001 | Devaux | 348/14.04 |
| 6,347,301 B1 | 2/2002 | Bearden, III et al. | |
| 6,351,252 B1 | 2/2002 | Atsumi et al. | |
| 6,356,905 B1 | 3/2002 | Gershman et al. | |
| 6,380,978 B1 | 4/2002 | Adams et al. | |
| 6,401,085 B1 | 6/2002 | Gershman et al. | |
| 6,424,369 B1 | 7/2002 | Adair et al. | |
| 6,434,403 B1 | 8/2002 | Ausems et al. | |
| 6,434,530 B1 | 8/2002 | Sloane et al. | |
| 6,463,299 B1 * | 10/2002 | Macor | 455/556.1 |
| 6,466,202 B1 | 10/2002 | Suso et al. | |
| 6,505,055 B1 * | 1/2003 | Kahn et al. | 455/564 |
| 6,522,352 B1 | 2/2003 | Strandwitz et al. | |
| 6,525,762 B1 | 2/2003 | Mileski et al. | |
| 6,526,580 B2 | 2/2003 | Shimomura et al. | |
| 6,532,152 B1 | 3/2003 | White et al. | |
| 6,535,493 B1 | 3/2003 | Lee et al. | |
| 6,549,229 B1 | 4/2003 | Kirby et al. | |
| 6,564,070 B1 | 5/2003 | Nagamine et al. | |
| 6,567,079 B1 | 5/2003 | Smailagic et al. | |
| 6,570,889 B1 | 5/2003 | Stirling-gallacher et al. | |
| 6,578,203 B1 * | 6/2003 | Anderson et al. | 725/141 |
| 6,624,846 B1 | 9/2003 | Lassiter | |
| 6,669,346 B2 | 12/2003 | Metcalf | |
| 6,681,398 B1 * | 1/2004 | Verna | 725/141 |
| 6,781,635 B1 * | 8/2004 | Takeda | 348/552 |
| 6,931,290 B2 | 8/2005 | Forest | |
| 6,934,510 B2 | 8/2005 | Katayama | |
| 2002/0057365 A1 | 5/2002 | Brown | |
| 2002/0090217 A1 | 7/2002 | Limor et al. | |
| 2002/0115454 A1 | 8/2002 | Hardacker | |
| 2002/0130967 A1 | 9/2002 | Sweetser | |
| 2002/0138587 A1 | 9/2002 | Koehler | |
| 2003/0004793 A1 | 1/2003 | Feuer et al. | |
| 2003/0005052 A1 | 1/2003 | Feuer et al. | |
| 2003/0005437 A1 | 1/2003 | Feuer et al. | |
| 2003/0014275 A1 | 1/2003 | Bearden, III et al. | |
| 2003/0023974 A1 | 1/2003 | Dagtas et al. | |

OTHER PUBLICATIONS

Written Opinion cited document in International Application No. PCT/US03/31696.

Dapeng Wu, Yiwel Thomas Hou, Wenwu Zhu, Hung-Ju Lee, Tihao Chiang, Ya-Gin Zhang, H. Jonathan Chao, "*On End-to-End Architecture for Transporting MPEG-4 Video Over the Internet*", IEEE, vol. 10, No. 6, Sep. 2000, 19 pgs.

Tolga K Capin, Eric Petajan, Joern Ostermann, "*Efficient Modeling of Virtual Humans in MPEG-4*", IEEE, 2000, 4 pgs.

Stefano Battista, Franco Casalino, Claudio Lande, "*MPEG-4 A Multimedia Standard for the Third Milennium, Part 1*", IEEE, 1999, 10 pgs.

*Wireless Dimensions Corporation Adds to Mobile-Venue Suite™*, www.wirelessdimensions.net/news.html, Jul. 26, 2000, 4 pgs.

"*Seeing is Believing—Motorola and PacketVideo Demonstrate MPEG4 Video Over GPRS*", Barcelona, Spain, May 10, 2000, 3 pgs.

W.A. Adamson, C.J. Antonelli, K.W. Coffman, P. McDaniel, J. Rees, "*Secure Distributed Virtual Conferencing: Multicrest or Bust*", CITI Technical Report 99-1, Center for Information Technology Integration, University of Michigan, Jan. 25, 1999, 7 pgs.

"SGI and the Pepsi Center", sgi™, 2 pgs.

* cited by examiner

AUDIO/VIDEO PROGRAMMING AND CHARGING SYSTEM AND METHOD

CROSS REFERENCE TO RELATED APPLICATION

This document is a continuation-in-part of and claims priority to non-provisional U.S. patent application entitled "Audio/Video Signal Distribution System For Head Mounted Displays," assigned Ser. No. 09/322,411, and filed May 28, 1999, now U.S. Pat. No. 6,578,203, which is incorporated herein by reference. This document also claims priority to copending non-provisional U.S. patent application entitled "Audio/Video System And Method Utilizing A Head Mounted Apparatus With Noise Attenuation," assigned Ser. No. 09/386,613, and filed Aug. 31, 1999, which is incorporated herein by reference. This document further claims priority to non-provisional U.S. patent application entitled "Electronic Handheld Audio/Video Receiver And Listening/Viewing Device," assigned U.S. patent application Ser. No. 09/837,128, and filed Apr. 18, 2001, which is incorporated herein by reference.

BACKGROUND OF THE INVENTION

1. Field of the Invention

The present invention generally relates to video and audio device programming, charging, and vending and, in particular, to a system and method for programming and charging one or more personal audio/video devices.

2. Related Art

Audio and video signals are generated from a plurality of sources during many events. For example, at an auto race, television crews usually position cameras at various locations within view of a race track. These cameras generate video signals defining views of the race track from various perspectives. In addition, microphones positioned at various locations generate audio signals defining different sounds at the auto race. For example, microphones may be located close to the race track to receive sounds produced by the vehicles participating in the race, and microphones may be located close to television commentators to receive the comments of the commentators as they observe and comment on the race.

One of the video signals and one or more of the audio signals are usually selected and combined together at a television station to form a combined video/audio signal. This signal is then modulated and transmitted so that users having a television can receive the combined signal via the television. The television demodulates the combined signal and displays an image defined by the video signal on a display screen and reproduces the sounds defined by the audio signals via speakers. Therefore, the sights and sounds of the race can be viewed and heard via the television.

In addition, one or more of the audio signals, such as audio signals defining the comments of radio commentators, are usually selected and modulated at a radio station to form a radio signal. This radio signal is then transmitted as a wireless signal so that users having radios can receive the signal via a radio. The radio demodulates the signal and reproduces the sounds defined by the radio signal via speakers.

However, users viewing and/or hearing the sights and sounds of the race via televisions and/or radios are not usually given the opportunity to select which video and/or audio signals are modulated and transmitted to the television and/or radio. Therefore, the user is only able to receive the signals modulated and transmitted to the television and/or radio, even though the user may prefer to receive the other audio and/or video signals that are generated at the auto race.

Spectators who actually attend the auto race are usually given more options to view and/or hear the sights and/or sounds of the race from different perspectives. In this regard, a plurality of monitors are usually located at particular locations in the stadium. As used herein, "stadium" shall be defined to mean any non-movable structure having a large number (i.e., thousands) of seats, wherein an event occurs at (i.e., within a close proximity of) the seats such that spectators sitting in the seats can view the event. An "event" is any occurrence viewed by a spectator.

Each monitor within the stadium receives one of the aforementioned video signals and displays an image defined by the received video signal to many of the spectators. However, the monitor does not always display a desirable perspective with respect to each spectator in the stadium, and the monitor is often not located in an inconvenient location for many of the spectators. In this regard, many of the spectators often must leave their seats (or other locations) in the stadium and go to a location where the spectators, along with other spectators, can view the monitor displaying the desired perspective. The spectators viewing the monitor often do not have control over which image is displayed by the monitor.

A way to address this need is with personal audio/video devices for use by spectators at an event or for use in association with an event. However, stadiums have varying audio and video frequencies available for use in connection with various events. Different stadiums in different geographical locations will also have different audio and video frequencies available for transmission in connection with the events.

Accordingly, there exists a need to alter or program the audio and video frequencies used by audio/video devices to ensure that one or more audio/video devices are able to receive the proper audio and video frequencies at each stadium and event. Similarly, after each use, an audio/video device may need to be charged before its next use. Accordingly, a need exists for providing and system and method for charging one or more audio/video device between uses.

SUMMARY OF THE INVENTION

The present invention overcomes the inadequacies and deficiencies of the prior art as discussed hereinbefore. Generally, the present invention provides a system and method for programming and/or charging one or more audio/video devices such that the audio/video device or devices will be properly programmed and charged to receive transmitted audio and video signals associated with an event, allowing a user to use the audio/video device to observe the sights and sounds of the event.

A preferred embodiment of the present invention includes a cart with a securing mechanism for each of a plurality of personal audio/video devices, a charger configured to charge the power source of each personal audio/video display device, and programming logic configured to program each of the personal audio/video devices.

In accordance with another feature of the preferred embodiment of the present invention, the cart includes a control panel to allow the appropriate audio and video frequencies to be selected for programming the personal audio/video devices.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The preferred embodiment of the present invention will be described hereafter in the context of auto racing applications. However, the scope of the present invention should not be so limited, and it should be apparent to one skilled in the art that the principles of the present invention may be employed in the context of other applications, particularly in the context of other sporting events (e.g., football games, basketball games, baseball games, hockey matches, etc.) and at various stadiums housing the sporting events.

Figure 1:
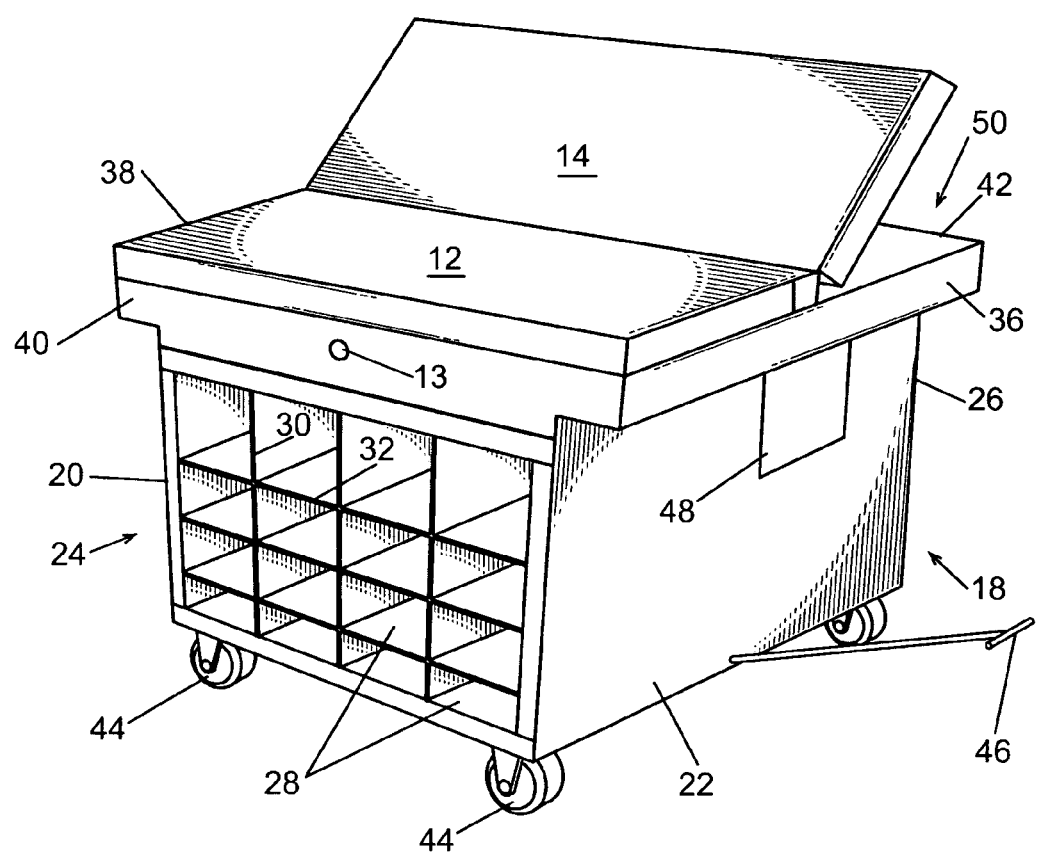
FIG. 1 is a three dimensional view of a preferred embodiment of the video/audio programming and charging system in accordance with the present invention.

FIG. 1 depicts a preferred embodiment of the programming and charging system implementing the principles of the present invention, a powered cart 10. The preferred cart 10 as depicted in FIG. 1 includes a left top panel 12 and a right top panel 14 hingedly connected together atop a base 18. The preferred base 18 includes a substantially rectangular back panel 20, a substantially rectangular front panel 22, a left side 24 and a right side 26. The left side 24 and right side 26 include a plurality of storage bins 28 interposed between the front panel 22 and the back panel 20. In the preferred embodiment, the storage bins 28 are substantially rectangular openings into the left side 24 and right side 26 of the base 18, evenly spaced between the front panel 22 and the back panel 20, each of the openings defined by vertical walls 30 and horizontal walls 32 substantially parallel to the front panel 22 and back panel 20.

In other embodiments, the storage bins 28 may be other shapes, including but not limited to circular, or triangular. In the preferred embodiment, the vertical walls 30 and horizontal walls 32 defining the openings do not run the entire length of the front panel 22 and back panel 20, with separate sets of storage bins 28 on the left side 24 of the base 18 and the right side 26 of the base 18, rather than continuous storage bins 28 running the entire length of the front panel 22 and back panel 20.

At the top of the base 18 in the preferred embodiment depicted in FIG. 1 is a front storage wall 36 extending outwardly and upwardly from the front panel 22 of the base 18. In the preferred embodiment there is a corresponding rear storage wall 38 extending outwardly and upwardly from the back panel 20 of the base 18. Additionally, the preferred embodiment includes a left storage wall 40 extending upwardly from the left side 24 of the base 18, and a right storage wall 42 extending upwardly from the right side 26 of the base 18. The front storage wall 36, rear storage wall 38, left storage wall 40, and right storage wall 42 defining a substantially rectangular charging/programming area 50.

In the preferred embodiment, the left top panel 12 and right top panel 14 are hingedly connected to each other, and to the front storage wall 36 and rear storage wall 38, such that the left top panel 12 in the down position (FIG. 1) covers the left half of the charging/programming area 50. When the left top panel 12 is in the up position, the left portion of the charging/programming area 50, and any contents therein, are exposed. Similarly, in the preferred embodiment, the right top panel 14 is hingedly connected to the left top panel 12, and the front storage wall 36 and rear storage wall 38, such that when the right top panel is in the down position, the right half of the charging/programming area 50 is covered. When the right top panel 14 is in the up position (as shown in FIG. 1), the right side of the charging/programming area 50, and any contents therein, are exposed.

In the preferred embodiment, there is also a lock 13 for securing and/or locking the left top panel 12 to the base 18 when the left top panel 12 is in the down position, ensuring that the left top panel 12 does not open, for safety and security purposes. Similarly, in the preferred embodiment, there is also a lock for securing and/or locking the right top panel 14 to the base 18 when the right top panel 14 is in the down position.

The preferred embodiment of the cart 10 depicted in FIG. 1 also includes steerable caster wheels 44 for rolling the cart 10 from one location to another. As would be known to one of skill in the art, the steerable caster wheels 44 may be configured to rotate about an axis to allow the cart 10 to turn to the right or left when pulled or pushed to the right or left. Similarly, the preferred embodiment of the cart 10 of FIG. 1, includes a tow bar 46 to allow the cart 10 to be pulled from one location to another. The preferred tow bar 46 is configured to attach to the back panel 20 of another cart 10 such that multiple carts may be connected together by the tow bar 46 of each cart 10, and the multiple carts 10 may be moved together by pulling the tow bar 46 of the lead cart 10.

The preferred embodiment of the cart 10 depicted in FIG. 1 further includes a power source for providing power to the charging/programming area 50, enabling the cart 10 to perform the charging and programming functions as described below. In the preferred embodiment the power source is a rechargeable power source, such as a battery, contained within the cart 10, that may be recharged at any standard electrical outlet. In other embodiments, the cart 10 may not contain a rechargeable power source, and may be configured to allow the cart to be plugged into any standard electrical outlet to provide power to the cart 10 to perform the charging and programming functions as described below. In yet other embodiments, the cart 10 may be configured to be powered via a non-standard electrical outlet.

Figure 2:
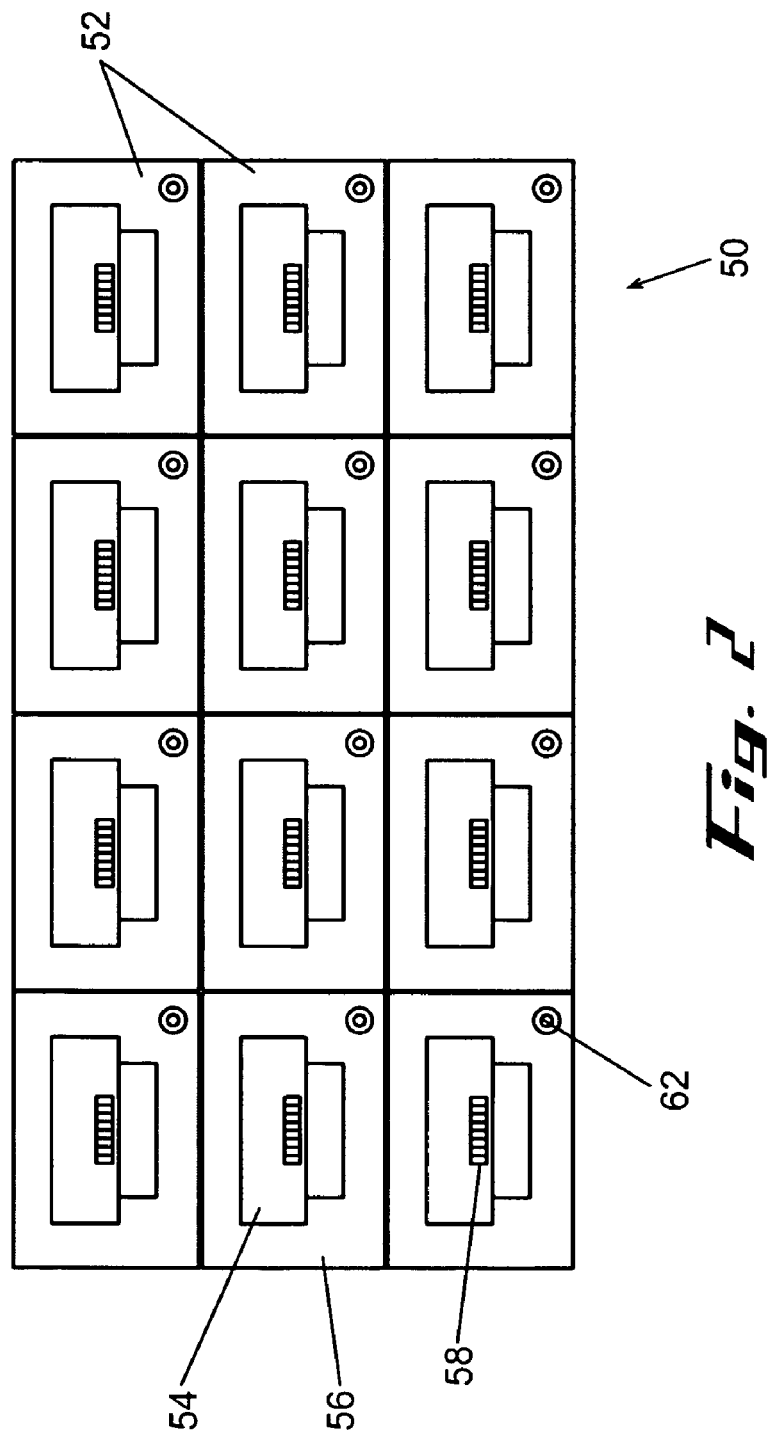
FIG. 2 is a top view of the preferred securing mechanism for a plurality of personal audio/video devices of the preferred embodiment depicted in FIG. 1.
Figure 3:
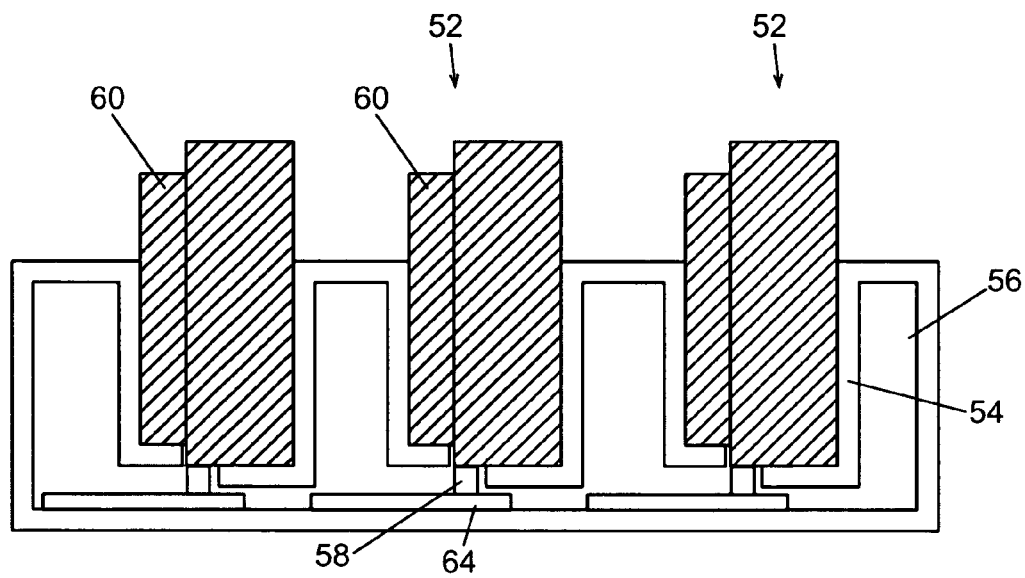
FIG. 3 is a side cut-away view of the preferred securing mechanism depicted in FIG. 2.

FIG. 2 depicts a preferred embodiment of the charging/programming area 50 depicted in FIG. 1. In the preferred embodiment, as shown in FIG. 2, the charging/programming area 50 includes a plurality of docking ports 52, for holding a plurality of audio/video devices 60 (FIG. 3). In the preferred embodiment, each docking port 52 is configured to hold one audio/video device 60. In the preferred embodiment, each docking port 52 includes a base portion 56 with a receiver pocket 54 disposed therein, the receiver pocket 54 being an opening in the base portion 56 for receiving an audio/video device 60 in the preferred embodiment. Each receiver pocket 54 is configured to receive at least one audio/video device 60, and may be configured in alternate embodiments to receive a plurality of audio/video devices 60. In other embodiments, the receiver pocket 54 may be configured to receive a portion of the audio/video device 60, where the portion o the audio/video device 60 that may need to be charged and/or programmed is detachable from the rest of the audio/video device 60.

As depicted in FIG. 2, the receiver pocket 54 in some embodiments, may be an opening in the base portion 56 that is substantially rectangular in shape. However, the receiver pocket 54 in other embodiments may be openings of other shapes. In yet other embodiments, the docking port 52 may comprise a base portion 56 containing a receiver pocket 54 extending upwardly (not shown) from the base portion 56, rather than being an opening into the base portion 56 as depicted in FIG. 2.

In the preferred embodiment, the receiver pocket 54 includes a charge/program connector 58, the charge/program receiving power from the power source of the cart 10. The charge/program connector 58 is configured to engage the audio/video device 60 when the audio/video device 60 is seated in the receiver pocket 54, such that electrical current and/or information or digital data may be transmitted between the receiver pocket 54 and the audio/video device 60.

In the preferred embodiment, the base portion 56 also includes a charge indicator light 62. The charge indicator light 62 is configured to illuminate in a first color when the audio/video device 60 is connected to the charge/program connector 58, indicating that a proper connection has been made. The charge indicator light 62 is further configured to illuminate in a second color when a proper connection has been made, and after the power source of the audio/video device 60 is fully charged.

FIG. 3 is a side cut-away view of the preferred docking port 52 depicted in FIG. 2, showing a cut-away view of sample audio/video devices 60 engaged in docking ports 52. As depicted in FIG. 3, in the preferred embodiment, each audio/video device 60 fits into a receiver pocket 54 formed in the base portion 56 of each docking port 52. When engaged with the docking port 52, the audio/video device 60 in the preferred embodiment fits snuggly inside the receiver pocket 54, and the audio/video device 60 engages with the charge/program connector 58. The charge/program connector 58 further includes logic to control the connection, which in the preferred embodiment as illustrated in FIG. 3, is contained on a charge/program printed circuit board 64 ("PCB"). As would be known to one of ordinary skill in the art, there are various ways in which the connection may be made such that information and/or digital data may be passed from the cart 10 through the charge/program connector 58 to at least one audio/video device 60, while at the same time power is passed to at least one audio/video device 60 to charge the power source of the audio/video device 60.

Figure 4:
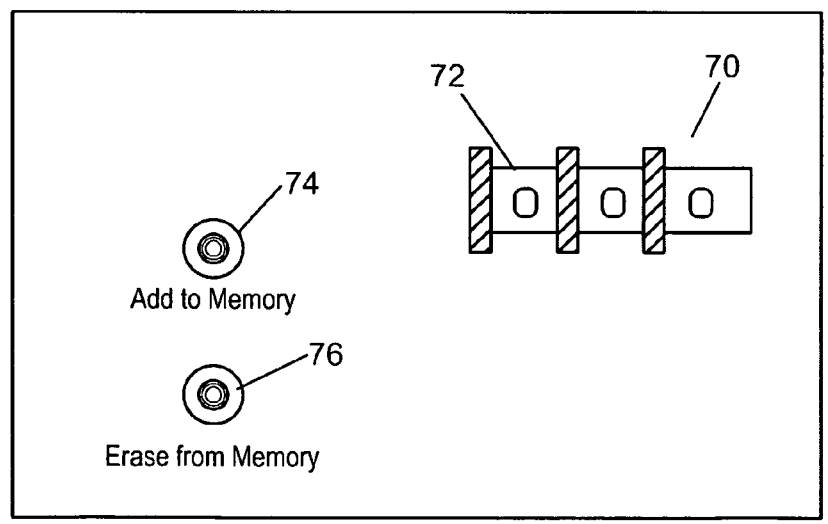
FIG. 4 is a front view of a control panel of the preferred embodiment depicted in FIG. 1.

There are also a variety of ways contemplated to select the information to be input into the audio/video device 60. For example the cart 10, in FIG. 1 includes a control panel 48 where instructions and/or information may be manually selected by an operator for transfer to the audio/video device 60 when the audio/video device 60 is fitted into receiver pocket 54 of the docking port 52 as depicted in FIG. 3. FIG. 4 depicts an example control panel 48. In the preferred embodiment, the control panel 48 would include one or more channel selectors 70. In the embodiment depicted in FIG. 4, a single channel selector 70 comprises a series of selector wheels 72 to allow an operator to select a desired value.

In the preferred embodiment, the control panel 48 also includes an add to memory activator 74 and an erase from memory activator 76. The add to memory activator 74 may be activated to add a frequency selected on the channel selector 70 to the memory of one or more audio/video devices 60 contained within the charging/programming area 50 of the cart 10. In the preferred embodiment, the selector wheels 72 of the channel selector 70 are manipulated by the operator to display a desired frequency. Once the desired frequency is selected on the channel selector 70, the add to memory activator 74 is activated by the operator. Upon activation of the add to memory activator 74, the frequency selected on the channel selector 70 is programmed into the memory of each audio/video device 60 that is fitted into a docking port 52 when the add to memory activator 74 is activated. In different implementations, the memory of the audio/video devices 60 may include software, hardware, and or firmware, and the programming of the memory may take place in a variety of manners that would be known to one of skill in the art.

Similarly, the erase from memory activator 76 may be activated to erase the frequency selected on the channel selector 70 from the memory of one or more audio/video devices 60 contained within the charging/programming area 50 of the cart 10. In the preferred embodiment, the selector wheels 72 of the channel selector 70 are manipulated by the operator to display a desired frequency. Once the desired frequency is selected on the channel selector 70, the erase from memory activator 76 is activated by the operator. Upon activation of the erase from memory activator 76, the frequency selected on the channel selector 70 is erased from the memory of each audio/video device 60 that is fitted into a docking port 52 when the erase from memory activator 76 is activated. In different implementations, the memory of the audio/video devices 60 may include software, hardware, and or firmware, and the erasing of the memory may take place in a variety of manners that would be known to one of skill in the art.

In different embodiments, the activators may be buttons, switches or other activation devices. Similarly, in other embodiments, the channel selector 70 may be a digital pad with a display, allowing manual entry of frequencies and other information by an operator through the digital pad. In yet other embodiments, the control panel 48 could include a receiving mechanism (not shown) allowing information to be transmitted to the system 10 from a remote device, including an infra-red or other wireless device, rather than manual entry of the information on the control panel 48 itself by the operator.

OPERATION

The system of the preferred embodiment is capable of storing, vending, programming and/or charging audio/video devices 60. In the preferred embodiment, the system is a cart 10 to program and/or charge personal audio/video devices 60 for use in association with events at a stadium as previously disclosed in copending non-provisional U.S. patent application Ser. Nos. 09/322,411, 09/386,613, and 09/837,128, which have been incorporated herein by reference.

In this preferred embodiment, the personal audio/video devices 60 may be stored in the charging/programming area 50 of the cart 10 when the personal audio/video devices 60 are not being used, with the left top panel 12 (FIG. 1) and the right top panel 14 both in the down position and secured. Additionally, the storage bins 28 allow for storage of equipment associated with the personal audio/video devices 60 or detachable portions of the personal audio/video devices 60 that do not need to be programmed or charged.

The steerable caster wheels 44 and tow bar 46 allow the cart 10 or a plurality of carts 10 to be easily transported to different stadiums, including stadiums in different geographic locations, or to different events at the same stadium. The hingedly connected top panels 12 and 14 allow the personal audio/video devices to be displayed and/or vended to potential users at a stadium or event, if desired, by unlocking and placing the left top panel 12 and/or right top panel 14 into the open position. Similarly, the personal audio/video devices 60 may be collected from users at the conclusion of an event and stored within the cart 10 until the personal audio/video devices 60 are vended or provided to users at the next stadium or event.

In the preferred embodiment, the cart 10 further allows programming the memory of and/or charging of the power source of one or more of a plurality of personal audio/video devices 60 when each personal audio/video device 60 is placed in a receiver pocket 54 in the charging/programming area 50 of the cart 10. As depicted in FIG. 3, when a personal audio/video device 60 is placed in the preferred docking port 52, the personal audio/video device 60 seats snuggly into the receiver pocket 54. In the preferred embodiment, the receiver pocket 54 is formed from molded plastic or other like material.

When placed in the receiver pocket 54, the personal audio/video device 60 engages the charge/program connector 58 contained within the preferred docking port 52, establishing a connection. The charge/program connector 58 allows electric current to flow between cart 10 and the personal audio/video device 60, charging the power source of the personal audio/video device 60. Additionally, the charge/program connector 58 in the preferred embodiment is controlled by logic allowing communication of information and/or data between the cart 10 and the personal audio/video devices 60. In the preferred embodiment, the logic is contained on a charge/program printed circuit board ("PCB") 64.

When one or more personal audio/video devices 60 are placed in the receiver pocket 54 and engage the charge/program connector 58, the power source of one or more personal audio/video device 60 may be charged through the charge/program connector 58 while the personal audio/video devices 60 are being stored in the charging/programming area 50 of the cart 10. In the preferred embodiment, each docking port 52 contains a charge indicator light 62 to indicate when the personal audio/video device 60 is properly seated in the docking port 52, such that the personal audio/video devices 60 is engaged with the charge/program connector 58.

The charge indicator light 62 in the preferred embodiment is an LED light which illuminates a first color when the personal audio/video device 60 is properly seated in the docking port 52, and the power source of the personal audio/video device 60 is being charged through the charge/program connector 58. In the preferred embodiment, the charge/program PCB 64 contains logic to detect when the power source of a personal audio/video device 60 is fully charged. When the power source of a personal audio/video device 60 is fully charged, the charge indicator light 62 for the docking port 52 containing the fully charged personal audio/video device 60 illuminates a second color indicating a proper connection, and that the personal audio/video device 60 is fully charged.

Further, in the preferred embodiment, the charge/program PCB 64 contains logic to enable only some of a plurality of personal audio/video devices 60 to be charged if desired. In this embodiment, less than all of the plurality of personal audio/video devices 60 contained in the charging/programming area 50 of the cart 10 may be charged, and any combination of the plurality of personal audio/video devices 60 may be selected for charging if desired, with the remaining unselected personal audio/video devices 60 not being charged through the charge/program connector 58.

Additionally, the logic, contained in the charge/program PCB 64 of the preferred embodiment, allows the memory of the personal audio/video devices 60 to be "programmed" with various information desired.

In one embodiment, the information "programmed" into the memory of the personal audio/video devices 60 will include assigning specific audio frequencies and video frequencies for each selectable channel of the personal audio/video devices 60, such as that discussed above in relation to the add to memory activator 74 and erase from memory activator 76. In this embodiment, the specific audio frequencies and video frequencies assigned to the selectable channels of the personal audio/video devices 60 will correspond to the audio frequencies and video frequencies available for use at the next stadium or event at which the personal audio/video devices 60 will be used. In this embodiment, the "programming" could further include erasing or deleting from the memory of the personal audio/video devices 60 the audio frequencies and video frequencies used by the personal audio/video devices 60 at the previous stadium or event.

In other embodiments, the "programming" may include upgrades, updates, alterations, or modifications to the software or firmware contained in one or more of the personal audio/video devices 60 and/or in the memory of one or more of the personal audio/video devices 60 placed in the charging/programming area 50 of the cart 10. As an example, and in no way intended to limit the present invention, the personal audio/video devices 60 may include instructions contained in software, firmware, and/or hardware of the audio/video devices 60 to enable the personal audio/video devices 60 to operate. These operating instructions may include software code stored in the memory of the audio/video devices 60. The "programming" of the present invention in this embodiment will include transferring new software code and/or new portions of software code into the memory of the audio/video devices 60 to upgrade the software code in the memory of the audio/video devices 60, enhancing performance. This upgrading may be performed in a variety of manners that would be known to one of ordinary skill in the art.

As with the charging, specific personal audio/video devices 60 placed or stored in the charging/programming area 50 of the cart 10 may be selected to receive "programming" information or data, while other personal audio/video devices 60 are not "programmed." Similarly, one or any number of personal audio/video devices 60 may be selected to receive a first set of "programming" information or data, while a second number of personal audio/video devices 60 may be selected to receive a second and different set of "programming" information or data.

By way of example, and in no way intended to limit the present invention, a first desired number of the personal audio/video devices 60 contained in the charging/programming area 50 of a cart 10 may be selected to receive a first set of audio frequencies and video frequencies, while a second desired number of the personal audio/video devices 60 contained in the unit charging/programming area of the same cart 10 may be selected to receive a second and different set of audio frequencies and video frequencies, and a third desired number of the personal audio/video devices 60 contained in the charging/programming area 50 of the same cart 10 may have all audio frequencies and video frequencies erased from memory.

The information or data to be "programmed" into one or more of the personal audio/video devices 60 may be communicated to the cart 10 by the operator in a variety of ways, including manually on a control panel 48 located on the cart 10 (FIG. 1), or by a remote device communicating the information to the cart 10, either through a direct connection or wirelessly, using methods that would be know to one skilled in the art.

In a preferred embodiment depicted in FIG. 1 and FIG. 3, a control panel 48 may be used to select information to be "programmed" into one or more of the personal audio/video devices 60. A variety of manual input mechanisms may be on the control panel 48, and as indicated in FIG. 3, a preferred embodiment includes a channel selector 70 by which various audio frequencies and/or video frequencies may be selected to be "programmed" into the memory of the personal audio/video devices 60.

In this embodiment, the control panel 48 further includes an add to memory activator 74 and an erase from memory activator 76, which may be buttons, switches or other activators. By selecting a value on the channel selector 74 and activating one of the activators 74 and 76, the value on the channel selector 74 may be "programmed" into, or erased from, the memory of one or more of the personal audio/video devices 60. Additionally, in other embodiments, the control panel 48 may include a channel selector 70, which includes a keypad with a display (not shown).

In other embodiments, the control panel may include a port, connector, or wireless receiver allowing an operator to use a remote device to communicate to the cart 10 the desired information or data to be "programmed" into one or more of the personal audio/video devices 60. Similarly, in some embodiments, the cart 10 may not have a control panel 48 at all, but instead just a port, connector, or wireless receiver allowing a remote device to communicate to the cart 10, the desired information or data to be "programmed" into one or more of the personal audio/video devices 60.

It should also be noted that the present invention has been described herein in the context of auto racing. However, the system may be useful in other applications as well. The system 10 would be useful in any application where it is desirable for the user to control the types of views and sounds of an event that are presented to the user via personal audio/video devices 60. For example, the present invention could be particularly useful in any type of sporting event or other type of event attended by a large number of people.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

The invention claimed is:

1. A system for use with at least one personal audio/video device to be used at first and second events by users while watching each of the first and second events live where the first and second events occur at different points in time, the audio/video device configured to wirelessly receive audio and video content associated with the first event during the first event and later to wirelessly receive audio and video content associated with the second event during the second event, the audio/video device presenting select corresponding audio and video content to the users while at each of the first and second events, comprising:

a docking port, the docking port configured to receive at least one personal audio/video device;

a charger for the personal audio/video device, the charger configured to charge a power source of the personal audio/video device when the personal audio/video device is engaged in the docking port; and logic circuit configured to transfer data related to the first event to the personal audio/video device when the personal audio/video device is engaged in the docking port, wherein the data is utilized by the audio/video device in connection with wirelessly receiving the audio and video content associated with the first event, wherein the data transferred by the logic circuit identifies first and second channels carrying first and second video content from first and second cameras, respectively, located at the first event, the first and second video content corresponding to different camera views of the first event.

2. The system of claim 1, wherein the system comprises a cart having a power source.

3. The system of claim 2, further comprising a plurality of carts, each of the plurality of carts including a tow bar system configured to allow connection of each of the plurality of carts to an adjacent of the plurality of cans.

4. The system of claim 1, wherein the docking port further comprises at least one receiver pocket for at least one personal audio/video device.

5. The system of claim 4, wherein the receiver pocket is configured to hold one personal audio/video device.

6. The system of claim 1, wherein the docking port is further configured with a charge/program connector.

7. The system of claim 1 wherein the logic circuit is further configured to transfer, as part of the data, channel data into the memory of at least one personal audio/video device, the channel data identifying at least one channel over which at least one of the audio and video content is conveyed.

8. The system of claim 7, wherein the logic circuit is further configured to erase audio and video channels from the memory of at least one personal audio/video device.

9. The system of claim 1, wherein the logic circuit is further configured to transfer: into memory of at least one personal audio/video device, operating instructions for the audio/video device.

10. The system of claim 1, further comprising a means for an operator to communicate with the logic circuit.

11. The system of claim 10, wherein the means for the operator to communicate with the logic circuit comprises a control panel.

12. The system of claim 10, wherein the means for the operator to communicate with the logic circuit comprises a wireless transmission.

13. A method of receiving a variety of audio and video signals at an event, comprising:

collecting a plurality of battery powered personal audio/video devices, the plurality of battery powered personal audio/video devices configured to be used by a first plurality of users at a first event;

storing the plurality of battery powered personal audio/video devices in docking ports;

while the plurality of battery powered personal audio/video devices are in docking ports;

(a) charging the batteries of the plurality of battery powered audio/video devices; and (b) programming the plurality of battery powered personal audio/video devices to at least one channel to be used to broadcast audio and video signals associated with a second event to allow the plurality of battery powered personal audio/video devices to be used by a second plurality of users at the second event, wherein the programming further comprises erasing at least one channel from a memory of at least one of the plurality of battery powered personal audio/video devices, programming a memory of a first portion of the plurality of battery powered personal audio/video devices with a first set of channels, and programming a memory of a second portion of the plurality of battery powered personal audio/video devices with a second set of channels.

14. The method of claim 13, further comprising providing the plurality of battery powered personal audio/video devices to the second plurality of users at the second event.

15. The method of claim 13, further comprising vending the plurality of battery powered personal audio/video devices to the second plurality of users at the second event.

16. The method of claim 15, further comprising transporting the plurality of battery powered personal audio/video devices from the first event at a first stadium to the second event at a second stadium.

17. The method of claim 13, wherein the step of programming further comprises programming at least one video channel and at least one audio channel into a memory of at least one of the plurality of battery powered personal audio/video devices.

18. The method of claim 17, wherein the video channel comprises a video channel available for use at the second event.

19. The method of claim 17, wherein the audio channel comprises an audio channel available for use at the second event.

20. A system for charging and programming a plurality of battery powered personal audio/video devices to be used at first and second events by users while the users watch each of the first and second events live where the first and second events occur at different points in time, the audio/video devices being configured to wirelessly receive audio and video content associated with the first event during the first event and later to wirelessly receive audio and video content associated with the second event during the second event, the video content being received from video cameras located at the first and second events, the audio/video device presenting select corresponding audio and video content while at each of the first and second events, the system comprising:

docking ports configured to receive the plurality of battery powered personal audio/video devices between the first and second events;

charger connectors configured to engage and charge batteries of the plurality of battery powered personal audio/video devices when docked at the docking ports;

program connectors configured to engage and transfer program information into a memory of at least one of the plurality of battery powered personal audio/video devices, the program information being utilized by the devices at one of the first and second events to obtain access to both audio and video content associated with the corresponding one of the first and second events, wherein the program information identifies first and second channels carrying first and second video content from first and second cameras, respectively, located at the first event, the first and second video content corresponding to different camera views of the first event; and a control panel for an operator to enter the program information.

21. The system of claim 20, further comprising a logic circuit configured to program operating instructions into the memory of at least one of the plurality of battery powered personal audio/video devices.

22. A method of providing audio/video devices to users while at events for use while watching the events live, the method comprising:

programming at least one of the audio/video devices with programming information associated with at least one of first and second events:

providing battery powered audio/video devices to users while at a first event, the audio/video devices each being configured to wirelessly receive audio and video content associated with the first event and to present, to the users while at the first event, audio and video content selected by the user;

at a conclusion of the first event, collecting the audio/video devices from the users;

after the first event and before the second event, refilling power supplies of the audio/video devices; and providing the audio/video devices to users while at the second, event, the audio/video devices being configured to wirelessly receive audio and video content associated with the second event, wherein the providing including vending common audio/video devices at the first and second events.

23. The method of claim 22, wherein the refilling includes recharging the power supplies.

24. The method of claim 22, wherein the programming includes programming frequencies over which the audio and video content are broadcast.

25. The method of claim 22, further comprising loading the audio/video devices into corresponding docking ports, at which the refilling and programming operations are performed.

26. The method of claim 22, wherein the programming operation includes, between the first and second events, adding a new channel to memory of at least one of the audio and video devices, the new channel carrying at least one of audio and video content associated with the second event to be presented to the user while at the second event and watching the second event live.

27. The method of claim 22, wherein the programming operation includes, between the first and second events, deleting an old channel from memory of at least one of the audio/video devices, the old channel carrying at least one of audio and video content associated with the first event that was presented previously to the user while watching the first event live.

28. The method of claim 22, wherein the programming includes at least one of upgrading, updating, altering and modifying at least one of software and hardware contained in at least one of the audio/video devices.

29. The method of claim 22, wherein the programming includes changing operating instructions for at least one of the audio/video devices.

30. The method of claim 22, wherein one of the audio/video devices is reprogrammed with new information, while another one of the audio/video devices is not reprogrammed during the programming operation.

31. A method of providing audio/video devices to users while at events for use while watching the events live, the method comprising:
   programming at least one of the audio/video devices with programming information associated with at least one of first and second events;
   providing battery powered audio/video devices to users while at a first event, the audio/video devices each being configured to wirelessly receive audio and video content associated with the first event and to present, to the users while at the first event, audio and video content selected by the user;
   at a conclusion of the first event, collecting the audio/video devices from the users;
   after the first event and before the second event, refilling power supplies of the audio/video devices; and
   providing the audio/video devices to users while at the second event, the audio/video devices being configured to wirelessly receive audio and video content associated with the second event, wherein the video content includes first and second video signals from first and second cameras located at the second event, the user selecting between the first and second video signals in order to view the second event from different views.

32. The system of claim 1, wherein the data transferred by the logic circuit identifies at least one frequency that conveys video content associated with the second event.

33. A system for use with at least one personal audio/video device to be used at first and second events by users while watching the first and second events live, where the first and second events occur at different points in time, the audio/video device configured to wirelessly receive audio and video content associated with the first event during the first event and later to wirelessly receive audio and video content associated with the second event during the second event the audio/video device presenting select corresponding audio and video content while at each of the first and second events, comprising:
   a power source for the personal audio/video device;
   logic circuit configured to transfer data related to the first and second events to the personal audio/video device, wherein the data is utilized by the audio/video device in connection with wirelessly receiving the audio and video content associated with the first and second events, wherein the logic circuit transfers first and second sets of video channels to the audio/video device for use while at the first and second events, respectively, the first set of video channels including video content associated with the first event, the second set of video channels including video content associated with the second event.

34. A method for providing portable video devices to be used at events by users while attending events live, the method comprising:
   providing portable video devices to users while at a first event, the video devices wirelessly receiving video content from a camera located at the first event, the video content being associated with the first event, the portable video device being configured to selectively display the video content while at the first event, thereby permitting the user to carry the portable video device about the first event and choose where to view the video content selected by the user while roaming at the first event during the first event;
   collecting the video devices from the users after the first event;
   refilling power supplies of the video devices; and
   providing the portable video devices to users while at a second event, the video devices wirelessly receiving video content from a camera located at the second event, the video content being associated with the second event, the portable video device being configured to selectively display the video content while at the second event, thereby permitting the user to carry the portable video device about the second event and choose where to view the video content selected by the user while roaming at the second event during the second event.

35. The method of claim 34, wherein the refilling includes recharging a rechargeable power supply.

36. The method of claim 34, further comprising, after the first event and before the second event, programming the video device with programming information associated with the second event.

37. The method of claim 34, further comprising programming at least one channel over which the portable video device receives the video content.

38. The method of claim 34, further comprising programming first and second channels over which the portable video device receives the video content associated with the first and second events, respectively, the portable video device receiving the first and second channels over at least one frequency.

39. The method of claim 34, further comprising transmitting the video content over video a plurality of channels that includes at least first and second channels conveying video signals associated with first and second views, respectively, of the first event.

40. The method of claim 34, further comprising programming the portable video devices through a wireless connection.

41. The method of claim 34, further comprising connecting the portable video devices to a wired program connection and programming the portable video devices directly through the wired program connection.

42. The method of claim 34, wherein the providing operations comprise providing the portable video devices at sporting events.

43. The method of claim 34, wherein the providing operations comprise providing the portable video devices at non-sporting events.

44. The method of claim 34, further comprising providing the portable video devices with audio capability to form portable audio/video devices, and configuring the portable audio/video devices to wirelessly receive audio content associated with the first event while at the first event, thereby permitting the user to carry the portable audio/video device about the first event and choose where to listen to the audio content selected by the user while roaming at the first event during the first event.

45. The method of claim 44, further comprising configuring the portable audio/video devices to wirelessly receive audio content associated with the second event while at the second event, thereby permitting the user to carry the portable audio/video device about the second event and choose where to listen to the audio content selected by the user while roaming at the second event during the second event.

46. The method of claim 45, further comprising programming first and second channels over which the portable audio/video device receives the audio content associated with the first and second events, respectively.

47. The method of claim 45, further comprising programming first and second channels over which the portable audio/video device receives the audio content associated with the first and second events, respectively.

* * * * *